(12) United States Patent
Nakatani et al.

(10) Patent No.: US 6,480,442 B1
(45) Date of Patent: Nov. 12, 2002

(54) DISK PLAYER CAPABLE OF DETECTING DIFFERENT SIZES OF OPTICAL DISKS

(75) Inventors: Mitsuo Nakatani, Tokyo (JP); Motonori Hoshino, Tokyo (JP); Katsumi Watanabe, Tokyo (JP); Hitoshi Ohno, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/406,736

(22) Filed: Sep. 28, 1999

(30) Foreign Application Priority Data

Sep. 28, 1998 (JP) .......................... 10-273791
Oct. 6, 1998 (JP) .......................... 10-284141

(51) Int. Cl.[7] .............................................. G11B 11/00
(52) U.S. Cl. .................. 369/30.36; 369/75.2; 369/77.1
(58) Field of Search ........................... 369/30.36, 30.24, 369/53.23, 53.22, 53.45, 47.36, 75.2, 77.2, 75.1, 77.1

(56) References Cited

U.S. PATENT DOCUMENTS

| 4,995,027 A | * | 2/1991 | Aoyagi et al. ............. 369/77.1 |
| 5,038,337 A | * | 8/1991 | Muramatsu et al. ....... 369/77.1 |
| 5,042,025 A | * | 8/1991 | Aoyagi et al. ............. 369/190 |
| 5,136,570 A | * | 8/1992 | Takai et al. ................ 369/77.1 |
| 5,150,349 A | * | 9/1992 | Takai et al. ................ 369/75.2 |
| 5,195,077 A | * | 3/1993 | Ishikawa et al. ........... 369/75.2 |
| 5,737,285 A | * | 4/1998 | Uchiyama ................... 369/34 |
| 6,167,015 A | * | 12/2000 | Jeong ......................... 369/77.1 |
| 6,304,537 B1 | * | 10/2001 | Seo et al. ................. 369/53.45 |

* cited by examiner

Primary Examiner—Tan Dinh
(74) Attorney, Agent, or Firm—McGinn & Gibb, PLLC

(57) ABSTRACT

A disk player includes a disk conveying section driven by a driver and a detecting section to detect control information of leading-in and ejection of the disk by the disk conveying section. The detecting section has a first sensor which detects a state of a leading-in start of the disk, a state of a re-leading-in start of the disk and a diameter of the disk.

20 Claims, 17 Drawing Sheets

DISK PLAYER CAPABLE OF DETECTING DIFFERENT SIZES OF OPTICAL DISKS

BACKGROUND OF THE INVENTION

The present invention relates to a disk player, and particularly to a disk player which detects a disk by using a plurality of sensors and controls leading-in and ejecting operations of the disk, and a technology to detect the object such as a disk, by a reflection type optical element.

Conventionally, many disk players are provided with a disk loading mechanism for lording-in and ejecting the disk. Normally, these disk players detect disk positions or disk diameters by sensors using optical elements, and based on these, control the disk loading mechanisms. The sensors for detecting the disk by using the optical element are roughly divided into 2 types of sensors such as transmission type and reflection type ones. The transmission type one of these sensors, detects the existence of the disk in such a manner that a light receiving portion and a light emitting portion are oppositely arranged in the upper and lower portions of the mechanism, and the light from the light emitting portion is interrupted by the disk, thereby the light receiving portion can not receive the light. On the other hand, the reflection type sensor detects the disk by receiving the light reflected by the disk when the disk exists on the light receiving and emitting surface of a reflection type photo-interrupter.

Conventionally, it is necessary that the sensor for such the disk loading control has 4 functions for leading-in start position detection, for disk diameter judgement, for ejection stop position detection, and for re-leading-in start position detection. When these 4 functions are realized by, for example, 3 sensors, the following structure can be considered. That is, as shown in FIG. 8, a loading roller 2 is provided on a disk insertion inlet 1a side in the disk player 1. The loading roller 2 is composed of 2 bar-like rollers provided in parallel to each other so that these rollers can nip and hold the disk, and arranged in parallel to the inserted disk surface and in the direction perpendicular to the disk insertion direction. One roller of the loading rollers 2 is rotatably provided so that it can be rotated by the driving mechanism provided with the drive source.

Three sensors A, B and C are arranged on the disk insertion inlet 1a side in the vicinity of such the loading rollers 2. The sensor A is used for leading-in start position detection, the sensor B is used for disk diameter judgement, and the sensor C is use both for ejection stop position detection and for re-leading-in start position detection. Two sensors A and B are located in the vicinity of the middle portion of the loading rollers 2 and in the disk insertion direction, and the sensor A is located on the disk insertion inlet 1a side, and the sensor B is located on the loading rollers 2 side. The sensor C is located in the vicinity of an end portion of the loading rollers 2.

Operations of sensors A, B and C, as described above, of the disk player 1 are as follows. That is, as shown in FIG. 9, when a disk D is inserted from the disk insertion inlet 1a, the sensor A detects it, and the loading rollers 2 start rotation. Then, when the disk D is pushed in the disk player 1, the leading edge of the disk D is nipped by the loading rollers 2, the disk D is pulled in by the loading rollers 2, and conveyed to a disk playing section, not shown. At this time, as shown in FIG. 10, the diameter of disk D is discriminated by the sensor B. That is, when the sensor B detects the disk D, the disk D is judged to be the 12 cm disk D1, and when the sensor B does not detect the disk D, the disk D is judged to be the 8 cm disk D2.

Next, after the playing operation in the disk playing section has been completed, and when the disk D is ejected, the disk D is nipped by the loading rollers 2 which are rotated in reverse to the case of insertion, and sent out. Then, as shown in FIG. 11, the sensor C detects off-position of the end portion of the disk D, and the loading rollers 2 stop in the condition that the disk D is nipped a little. At the condition, when the disk D is pushed in, the end portion of the disk D is detected by the sensor C, as shown in FIG. 12, and the loading rollers 2 are rotated in the pulling-in direction, and the disk D is pulled in again.

Incidentally, as described above, the sensors provided in the disk player are expensive, and when a large number of such sensors are provided in the disk player, it is disadvantageous in cost. Further, when a large number of sensors are installed, man-hours are increased. Particularly, because high accuracy is required for sensors, for example, in order to avoid the influence by the heat, caution is necessary for soldering, and so on, in short, because handling operations when a large number of sensors are installed, are rather difficult, thereby, the use of a large number of sensors are disadvantageous in an increase of the assembly efficiency and a reduction of the production cost.

As previously mentioned, the sensors each using an optical element are basically classified into two types of sensors, such as transmission type ones and reflection type ones exist as shown in FIGS. 13A to 14B.

The transmission type sensors of these ones, as shown in FIG. 13A, are structured such that a light receiving section 11 and a light emitting section 12 are arranged opposite to each other, and on standby condition, the light receiving section 11 are receiving the light always. As shown in FIG. 13B, when a disk 13 exists between the light receiving section 11 and the light emitting section 12, the disk 13 interrupts the light from the light emitting section 12 and the light receiving section 11 can not receive the light, thereby, the existence of the disk 13 is detected.

In this case, as the light receiving section 11, a phototransistor, or the like, is used, and as the light emitting section 12, an LED, or the like, is used. Further, in FIGS. 13A and 13B, as an example, a case where the light receiving section 11 is equipped on an upper portion 14 of the mechanism, and the light emitting section 12 is equipped on a printed-wiring board 15 arranged in the mechanism, is shown. In this connection, numeral 16 in the drawing is a wire which electrically connects the light receiving section 11 side to the light emitting section 12 side.

On the other hand, the reflection type sensor uses a reflection type photo-interrupter 17 which is a single body, as shown in FIG. 14A, and on standby condition, a condition that the reflection type photo-interrupter 17 emits the light always, is made to be kept. As shown in FIG. 14B, when the disk 13 exists on a light receiving and light emitting surface 17a of this reflection type photo-interrupter 17, the disk 13 is detected when the light reflected by the disk 13 is received.

In the disk player, it is necessary to provide a plurality of sensors to detect a disk leading-in start, to judge the disk diameter, to detect a disk ejection stop, or the like. However, depending on the arrangement position or arrangement direction of the plurality of sensors, optical paths of sensors interfere with each other, and there is a case where stable detection becomes difficult, thereby, malfunction is generated.

Further, in the transmission type detection system as shown in FIG. 13, because the light receiving section 11 and light emitting section 12 are separated, it is necessary to fix each of them respectively on a chassis or a board in the mechanism, and a wiring 16 to connect the light receiving section 11 to the light emitting section 12 is necessary. This results in an increase of the number of parts, complication of the apparatus, and an increase of man-hours.

On the other hand, in the reflection type detecting method as shown in FIG. 14, the method is structured to use the reflection type photo-interrupter of a single body, therefore, the number of parts can be reduced as compared to the transmission type detecting method, however, there is a possibility of misdetection due to dispersion of the reflectance of the disk 13.

That is, because many members constituting the mechanism is structured by metallic plate, and the reflectance is relatively high, the reflection type photo-interrupter 17 receives some amount of reflection light from the inside of the mechanism even when the disk 13 does not exist on the light receiving and light emitting surface 17a. Therefore, when the light receiving sensitivity of the reflection type photo-interrupter 17 is high, the reflection light from the inside of the mechanism and that from the disk 13 can not be discriminated, and there is a possibility that misdetection is generated. In order to avoid such the misdetection, it is considered that the light receiving sensitivity of the reflection type photo-interrupter 17 is lowered, however, in this case, there is a possibility that misdetection is generated due to dispersion of the reflectance of the disk 13 itself.

In this connection, such a problem as described above is not limited to the case of disk detection, but exists in the same manner, also when the positions of each type of operation members in the disk player are detected by the optical elements.

SUMMARY OF THE INVENTION

The present invention is proposed in order to solve the above-described problems of the conventional art. An object of the present invention is to provide a disk player in which the disk can be controlled by a small number of sensors.

Another object of the present invention is to provide a disk player in which a structure is simple and the detection can be stably performed, and malfunction can be prevented.

In order to solve the above-described problems, in the disk player having a disk conveying section driven by a drive source, and a detecting section to detect the control information of the leading-in and eject of the disk by the disk conveying section, the present invention has the following technological characteristics.

That is, according to the first aspect of the present invention, the detecting section has one sensor, as the first sensor, to detect a state of a leading-in start of the disk, a state of a re-leading-in start of the disk and a diameter of the disk.

In the invention as described above, because one sensor, as the first sensor, has a plurality of combined functions, the number of sensors can be reduced as compared to the case where a sensor is provided for each function.

Preferably, in the disk player as described above, the fist sensor is installed at a position at which both end portions of the disk, a central hole of the disk, or a boundary portion of a transparent portion and a reflecting portion of the inner periphery of the disk can be detected.

When the disk is inserted into the disk player, the first sensor detects the leading edge portion of the inserted disk, thereby, the state of leading-in start is detected, and the disk conveying section starts the disk leading-in operation. Then, the trailing end of the disk after leading-in is detected by the first sensor, thereby, the disk diameter is detected. Further, at the time of the disk ejection, the first sensor detects the central hole of the disk, or the boundary portion of a transparent portion and a reflecting portion of the inner periphery of the disk, thereby, the state of re-leading-in start of the disk is detected, and the disk conveying section starts the re-leading-in operation of the disk.

More preferably, the detecting section further has the second sensor to detect an ejection stop state of the disk.

Because, by only two sensors of the first and the second ones, the control of the disk leading-in and ejection can be performed, thereby, the number of sensors can be reduced.

Furthermore, the second sensor is provided at a position at which the end portion of the disk can be detected. The leading edge of the disk at the time of ejection is detected by the second sensor, thereby, the ejecting operation of the disk by the disk conveying section is stopped. At this state, when the disk is pulled out, the disk can be taken out. On the other hand, when the disk is pushed in at that state, the first sensor detects the re-leading-in start state of the disk, and the re-leading-in operation of the disk by the disk conveying section is started.

Moreover, the first and second sensors are reflection type ones or transmission type ones. In the invention as described above, the reflection type sensors or transmission type sensors are used, however, by limiting the number of them, the disk control by the highly accurate detection can be realized and the production cost can also be reduced.

In order to attain the above-described object, a disk player having a detecting section to detect an objective material in a mechanism, in which the detecting section is composed of an optical element having a light receiving and light emitting surface, and a reflection surface provided at a position at which the light from the light emitting surface is reflected onto the light receiving surface, the present invention has the following technological characteristics.

That is, according to the second aspect of the present invention, the light receiving and light emitting surface and the reflection surface are arranged with an inclination to the horizontal surface of the mechanism, and as the detecting section, a plurality of detecting sections are provided at positions at which optical paths between the optical element and the reflection surface do not interfere with each other.

Accordingly, the light receiving surface of the optical element always receives the reflected light, which is emitted from the light emitting surface and reflected via the reflection surface, on the standby condition. When an object material such as a disk, or the like, exists between the light receiving and light emitting surface and the reflection surface, because the reflected light goes to the different direction from the light receiving surface, the light receiving surface does not receive the reflected light, thereby, the existence of the object material is detected. The plurality of detecting sections are provided at positions at which their optical paths do not interfere with each other, and thereby, stable detection can be performed and malfunction can be prevented.

Preferably, at least two detecting sections are arranged in the different directions from the direction of the optical paths, viewed from the direction of the plane surface of the mechanism, in the disk player.

The arrangement directions of the plurality of detecting sections are different from the direction of their optical paths, therefore, the interference of the optical path which tends to occur in the case where the detecting section is arranged in almost the same direction as the direction of its optical path, is prevented.

More preferably, at least two detecting sections are arranged in,the direction almost perpendicular to the direction of the optical path, viewed from the direction of the plane surface of the mechanism, in the disk.

The arrangement direction of a plurality of detecting sections is the direction almost perpendicular to the direction of their optical path, therefore, the overlap of the optical path of the detecting section does not occur with each other, thereby, the interference with each other is prevented.

Furthermore, at least two detecting sections are arranged such that the optical paths are reverse to each other, viewed from the direction of the plane surface of the mechanism, in the disk player. At least two detecting sections are arranged in the direction in which one light receiving and light emitting surface is not opposed to the other light receiving light emitting surface, in the disk player.

The optical paths of detecting sections are in the separating direction from each other, and therefore, the overlap of the optical path of the detecting section does not occur with each other, thereby, the interference with each other is prevented.

DETAILED DESCRIPTION OF THE PREFERRED EMBODIMENTS

Referring to FIGS. 1 to 5, a first embodiment of the present invention will be concretely described below. In this connection, in FIGS. 1 to 5, the lower side corresponds to the front side, and the upper side corresponds to the rear side.

[1. Structure]

Figure 1:
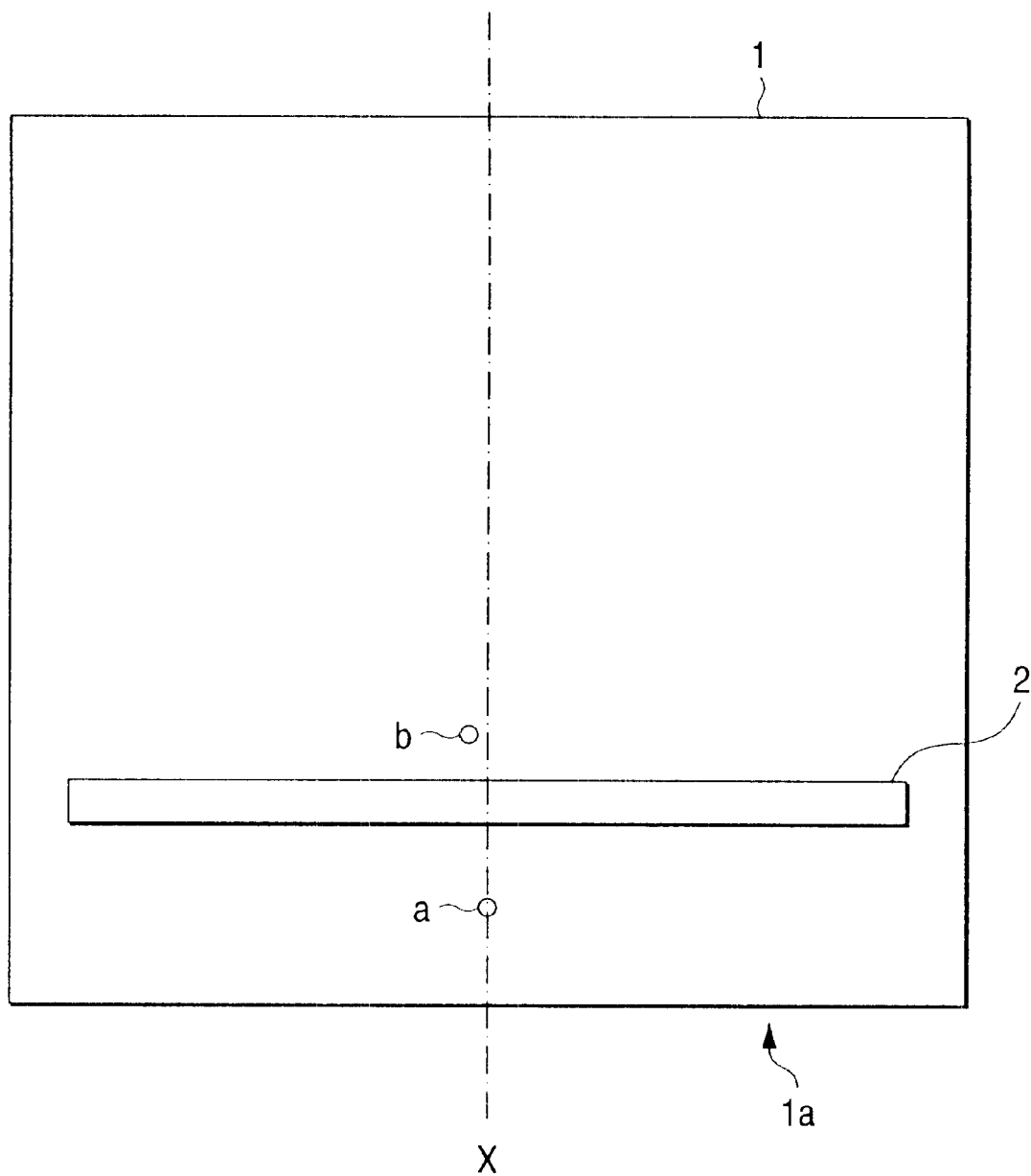
FIG. 1 is a simplified plan view showing the sensor arrangement in an embodiment of a disk player of the present invention.

Initially, referring to FIG. 1, the structure of the present embodiment will be described below. FIG. 1 is a simplified plan view of the present embodiment, and illustrations of a disk playing section, disk chucking mechanism, operation buttons, etc., are omitted. That is, in the same manner as in the conventional technology shown in FIG. 8, loading rollers 2 are provided in the disk player 1. A sensor a and a sensor b are located in the front and rear of loading rollers 2, with the loading rollers 2 between them, viewed from the direction of the plane surface. The sensor a, provided in the front of loading rollers 2, is arranged on a line X passing through the middle portion of the loading roller 2, or in the vicinity of the line, in the conveying direction of the disk, viewed from the direction of the plane surface. Further, the sensor a is provided at a position which is not off-positioned from the front end of the 12 cm disk D1 after leading-in, but off-positioned from the front end of the 8 cm disk D2 after leading-in (refer to FIG. 3).

Further, the sensor b is provided at a position at which the rear end of the disk D is off-positioned when the ejected disk comes to a position at which the disk D can be manually pulled-out from the outside, and the rear end of the disk D is nipped a little by the loading rollers 2. In this connection, the drive mechanism to drive the loading rollers 2 is controlled by a control circuit, not shown, and sensors a and b are connected to this control circuit.

[2. Operation]

Figure 2:
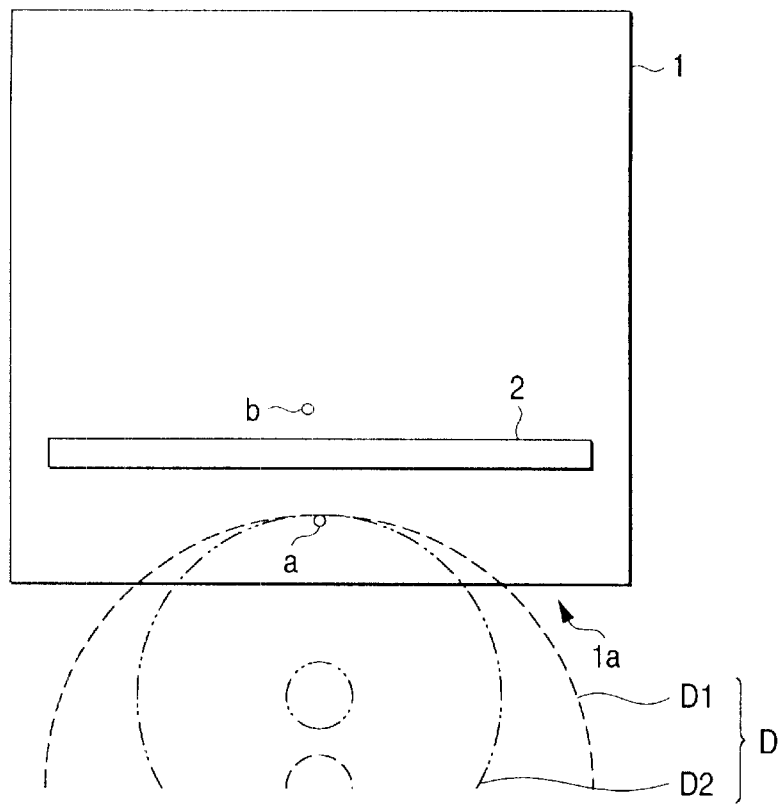
FIG. 2 is a simplified plan view showing the time of the disk leading-in start in the embodiment of FIG. 1.
Figure 3:
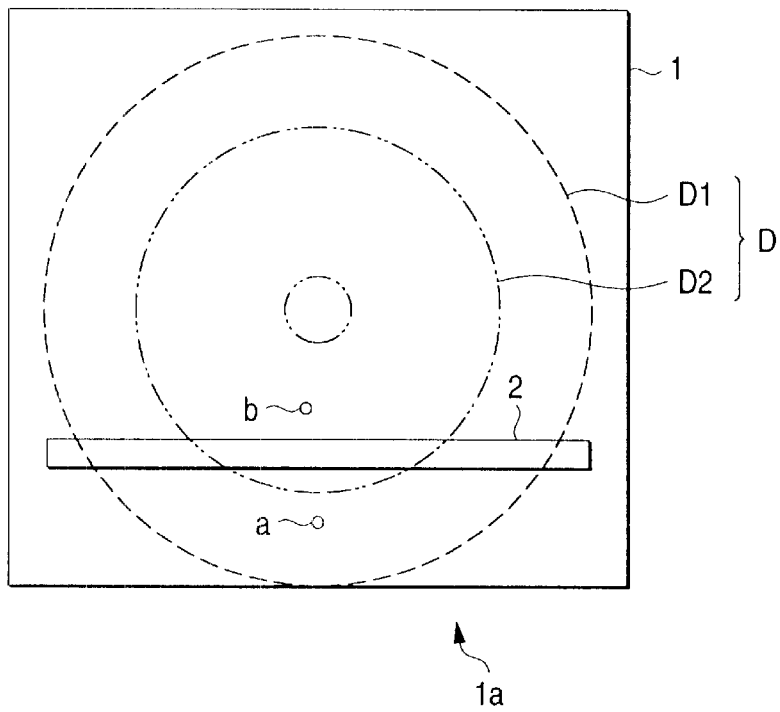
FIG. 3 is a simplified plan view showing the time of the disk diameter detection in the embodiment of FIG. 1.
Figure 4:
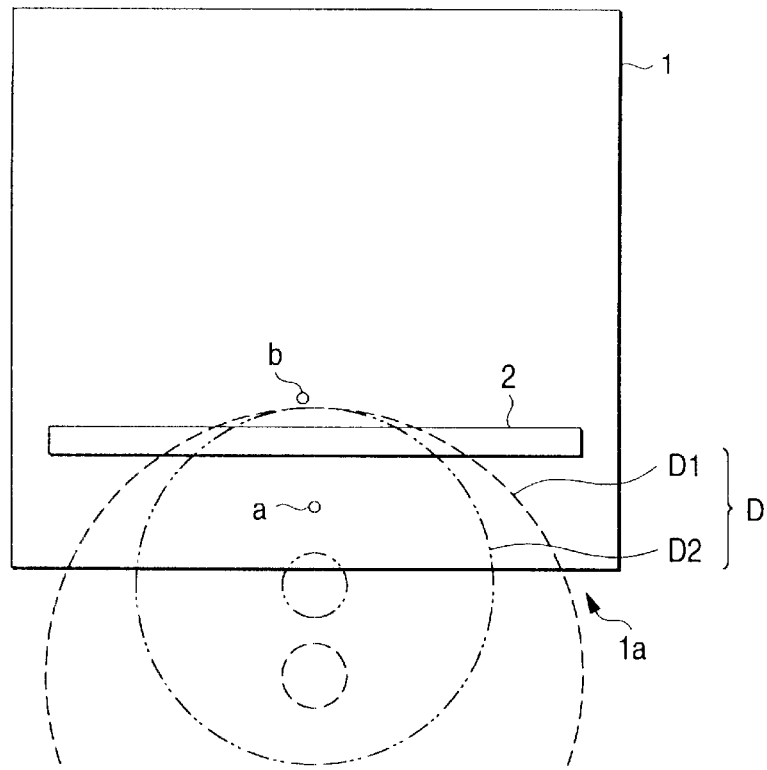
FIG. 4 is a simplified plan view showing the time of the disk ejection in the embodiment of FIG. 1.
Figure 5:
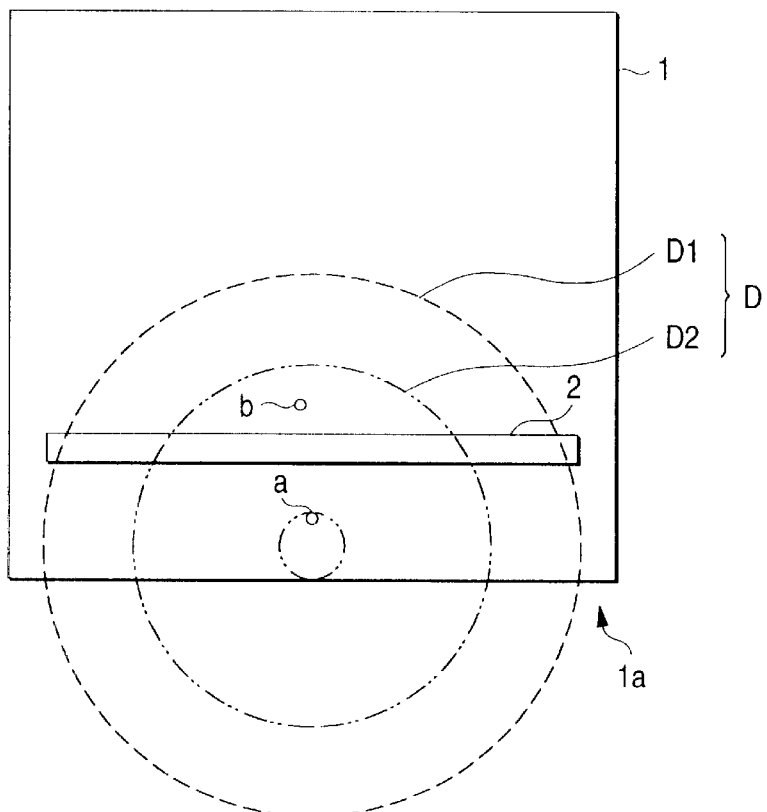
FIG. 5 is a simplified plan view showing the time of the disk re-leading-in start in the embodiment of FIG. 1.

Referring to FIGS. 2 to 5, the operation of the present embodiment as described above will be described below. Herein, FIG. 2 shows the leading-in start time, FIG. 3 shows the disk diameter judgement time, FIG. 4 shows the ejection stop time, and FIG. 5 shows the re-leading-in start time. In this connection, the following operations are conducted when the control circuit controls the operation of the loading rollers 2 corresponding to the detection by the sensors a and b. That is, as shown in FIG. 2, when the disk D is inserted from the disk insertion inlet 1a, the sensor a detects the trailing end of the disk D and the loading rollers 2 start the rotation. When the disk D is pushed in, the trailing end of the disk D is nipped by the loading rollers 2, and the disk D is pulled in by the loading rollers 2, and conveyed to the disk playing section.

Further, after the respectively positioned disks D are chucked in the disk playing section by stoppers for the 8 cm and 12 cm disks, not shown, the chucking is detected by a detector, not shown. At that time, as shown in FIG. 3, the diameter of the disk D is detected by the sensor a. That is, when the disk D exists on the sensor a, it is judged to be the 12 cm disk D1, and when the front end of the disk D is off-positioned from the sensor a, it is judged to be the 8 cm disk D2.

Next, by operating the operation button for ejection, when the ejection of the disk D is indicated, the loading rollers 2 nip the disk D and operated in reversed to the case of the disk leading-in, thereby, the disk D is sent out to the disk insertion inlet 1a side. Then, as shown in FIG. 4, when the sensor b detects that the trailing end of the disk is off-positioned, the loading rollers 2 stop on the state that the loading rollers 2 nip the disk D a little.

Although it is possible that the disk D is pulled out on this state, when the disk D is pushed in again as shown in FIG. 5, the sensor a detects the edge portion of the central hole of the disk or the boundary portion of the transparent portion and the refection portion of the inner periphery of the disk, and the loading rollers 2 are rotated in the same direction as in the case of the disk leading-in, and the disk D is led in again.

[3. Effects]

Effects of the present embodiment described as above, are as follows. That is, because one sensor can be provided with 3 functions of the leading-in start position detection, the disk diameter detection and the re-leading-in start position detection, a reduction of the production cost and a reduction of man-hour are possible as compared to the case where a sensor is provided for each function.

Particularly, in the above conventional technology, the sensor C is used in combination with 2 functions, and the total number of sensors provided for the disk loading control are 3, however, in the present embodiment, 2 sensors of the sensor a having 3 functions and the sensor b for the ejecting position detection can realize the disk loading control, thereby, the production cost and the man-hour can be more reduced.

Further, because the number of sensors, for which handling is rather difficult and the high accuracy is required for installing, can be reduced, a generation rate of no good products at the production time, and that of malfunction due to a long time use can be reduced, thereby, the reliability of the products is increased.

Further, the mechanism has a simple structure in which the number of sensors are reduced, therefore, it can be applied for various type of disk players 1, and a change of the design work required when the mechanism is applied for the conventional type disk player 1, is easy.

[4. Another Embodiment]

The present invention is not limited to the above-described embodiment, but, other than above-described embodiment, the various variations can be performed within the scope of the present invention. For example, the type of sensors may be reflection type optical sensors or transmission type optical sensors. By using such sensors, the highly accurate detection can be performed, and the number of sensors can be reduced as described above, thereby, the production cost can be reduced.

Figure 6:
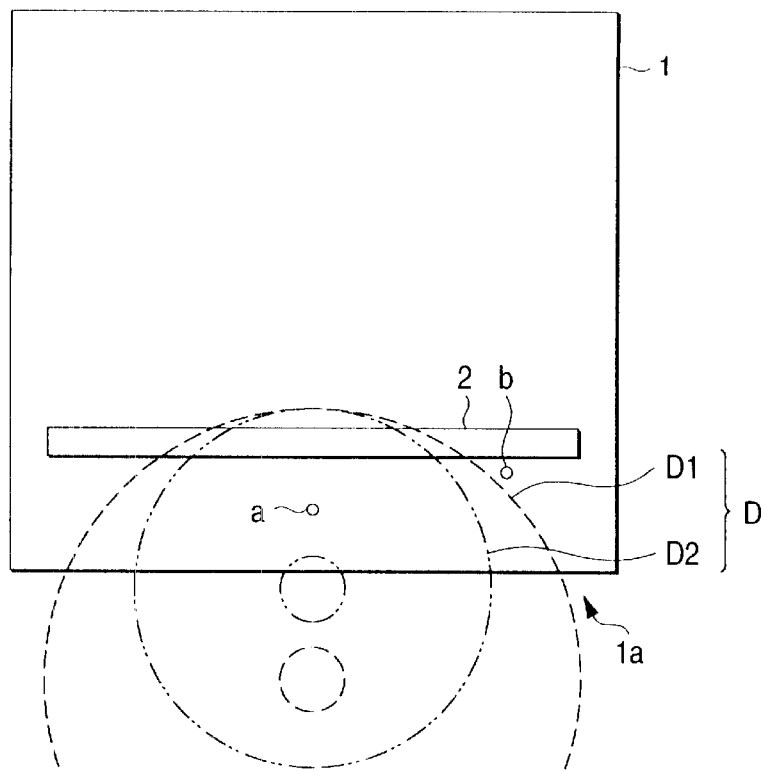
FIG. 6 is a simplified plan view showing the sensor arrangement in another embodiment of the disk player of the present invention.
Figure 7:
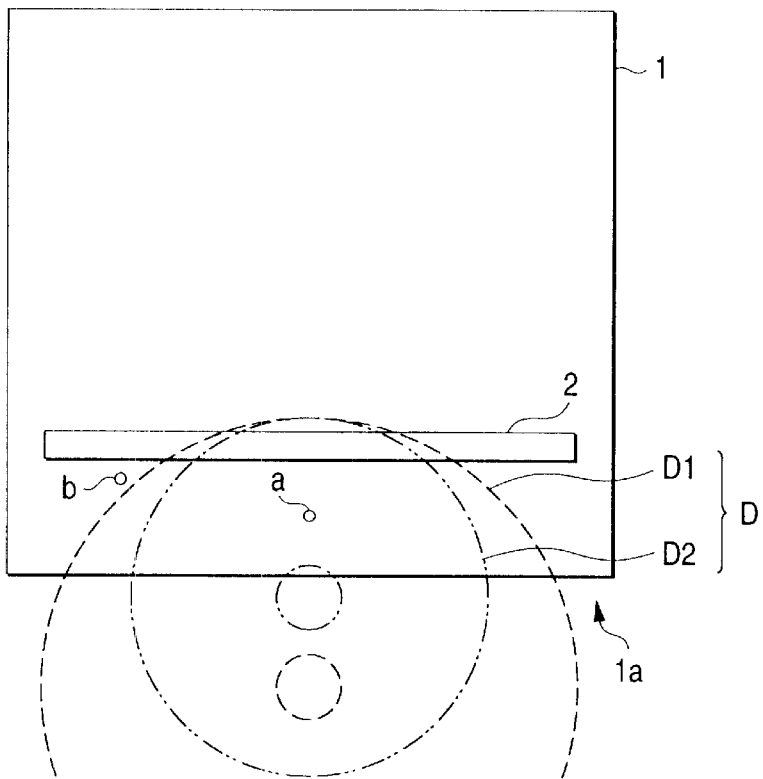
FIG. 7 is a simplified plan view showing the sensor arrangement in still another embodiment of the disk player of the present invention.

Further, the sensor position can be appropriately changed corresponding to the diameter of the disk D, the diameter of the central hole, or portions to be detected. For example, as shown in FIG. 6, the sensor b may be provided near the right end portion in the front of the loading roller 2, and the eject position detection of, the disk D may be carried out at the end portion of the right side rather than the rearmost end portion of the disk D. In the same manner, as shown in FIG. 7, the sensor b may be provided near the left end portion in the front of the loading rollers 2.

In the detection of the disk position or disk diameter by the above-described sensors, various portions of the disk may be the objects to be detected. That is, any portion of the outer periphery or inner periphery of the disk, or any portion of the boundary of the transparent portion and reflection portion of the disk may be an object to be detected. Further, grooves or protrusions formed on the disk, coated material or adhered material on the disk, or the other disk portions may be an object to be detected.

Further, the conventional technology can be freely applied to Various mechanisms in the disk player. For example, the disk conveying section which conducts the disk leading-in and ejection, may be structured by another structure rollers, or a mechanism other than the roller.

As described above, according to the present invention, a disk player, in which the control of the disk can be performed by a small number of sensors, can be provided.

Referring to the drawings, other embodiments to which the present invention is applied, will be concretely described below.

[4. The Second Embodiment]

4-1. Structure 4-1-1. Structure of the Sensor

Figure 15A:
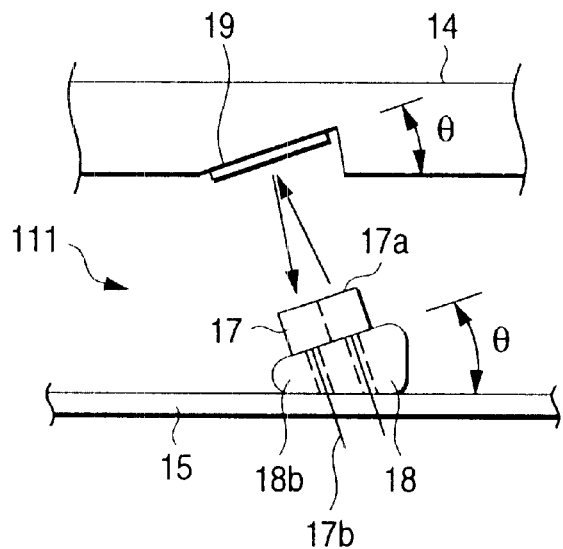
FIG. 15A is a structural view showing the standby state of a sensor in the second embodiment of a disk player of the present invention.
Figure 15B:
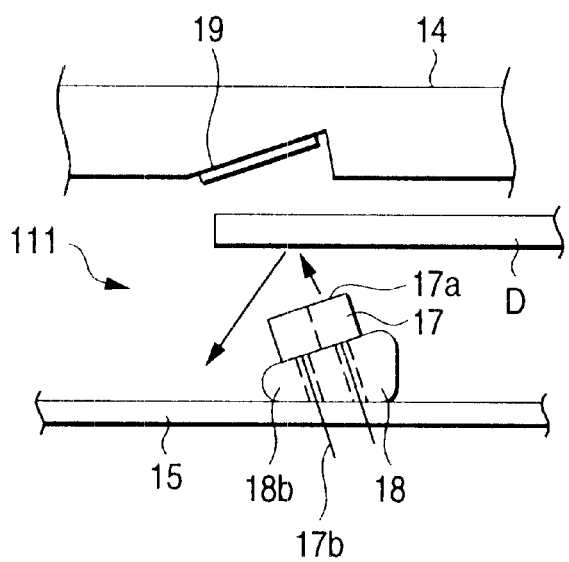
FIG. 15B is a structural view showing the detection state of the sensor in the second embodiment of the disk player of the present invention.

Initially, referring to FIGS. 15A and 15B, the structure of sensors used in the present embodiment will be described below. FIG. 15A and FIG. 15B are structural views of a sensor, and FIG. 15A is a on-standby condition, FIG. 15B is a on-detecting condition of the sensor. A single body reflection type photo-interrupter 17 having a light receiving and light emitting surface 17a is mounted on a printed wiring board 15 through a plastic spacer 18 with a predetermined inclination angle θ. This spacer 18 is structured such that the upper main surface on the side on which the reflection type photo-interrupter 17 is mounted, has a predetermined inclination angle θ to the lower main surface on the side which is mounted on the printed wiring board 15. In the spacer 18, guide holes (guide section) 18a are provided, and leads 17b of the reflection type photo-interrupter 17 are inserted into the guide holes 18a, and leading edges of the leads 17b are connected to the printed wiring board 15.

On the other hand, on a portion of the upper portion 14 of the mechanism, facing the light receiving and light emitting surface 17a of the reflection type photo-interrupter 17, an inclined surface which is parallel to the light receiving and light emitting surface 17a, is formed, and on its surface, a silver reflection sheet (light reflective material layer) 19 is adhered. The reflection sheet 19 is arranged such that it always receives the light from the reflection type photo-interrupter 17. As described above, a sensor 111 is composed of a set of the reflection type photo-interrupter 17 and the reflection sheet 19.

4-1-2. Arrangement of Sensors

Figure 16:
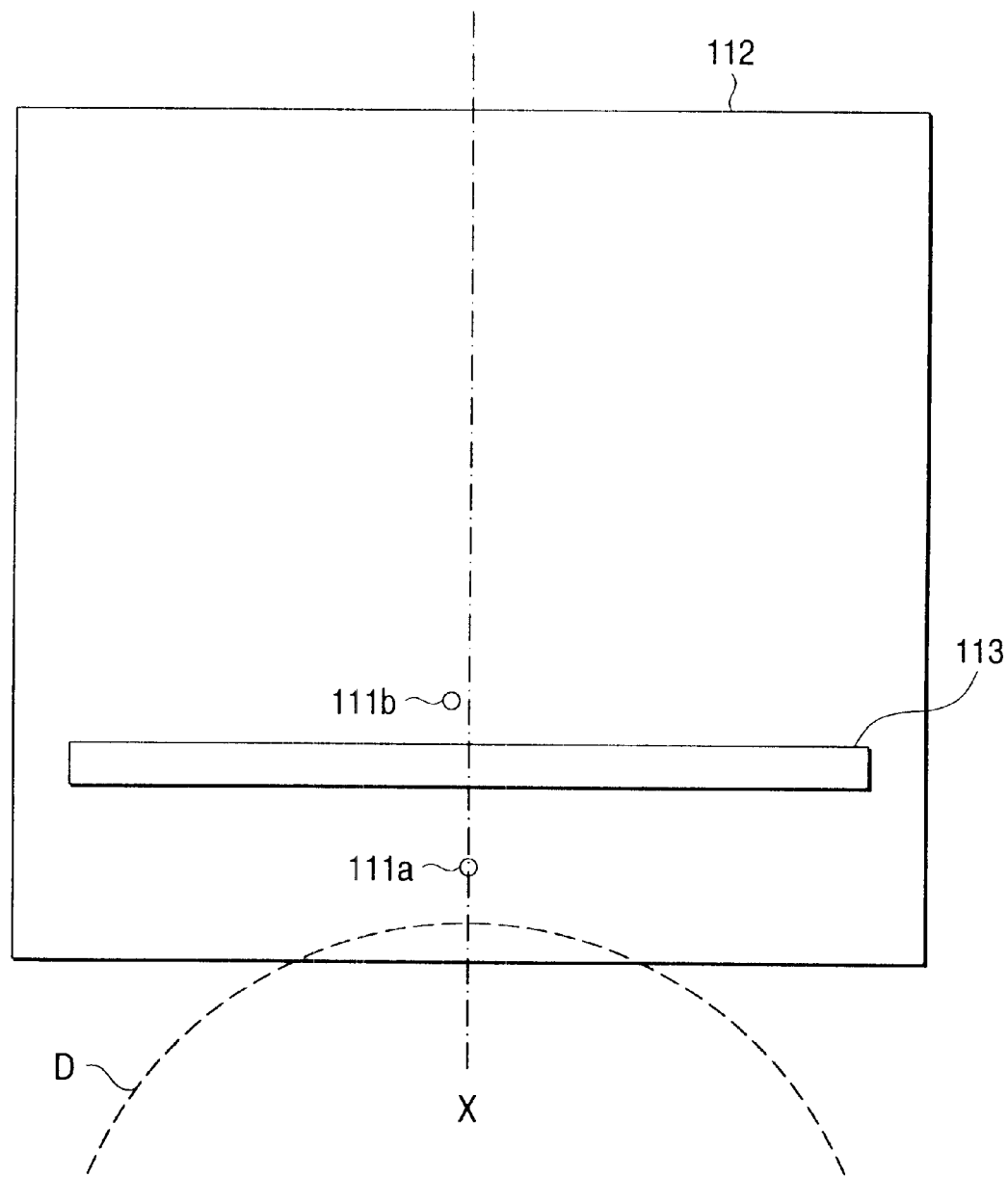
FIG. 16 is a simplified plan view showing the second embodiment of the disk player of the present invention.
Figure 17:
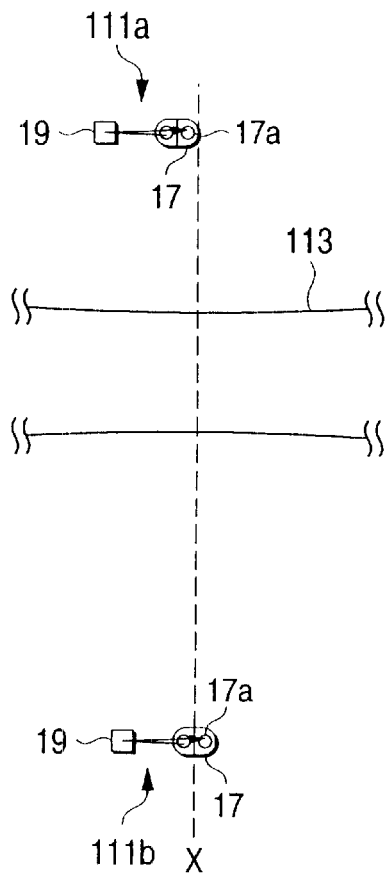
FIG. 17 is an enlarged plan view showing the arrangement of the sensors in the second embodiment of the disk player of the present invention.
Figure 18:
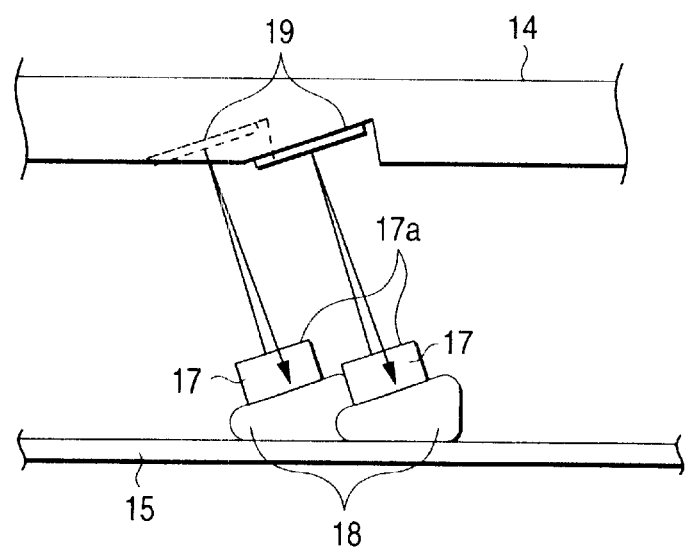
FIG. 18 is a front view of the sensor arrangement in FIG. 17.

Next, referring to FIGS. 16 to 18, the arrangement of the sensor in the disk player will be described. FIG. 16 is a simplified plan view of the present embodiment, and illustrations of a disk playing section, disk chucking mechanism, operation buttons, or the like, are omitted. FIG. 17 is an enlarged plan view of the sensor arrangement portion, and FIG. 18 is a front view.

That is, as shown in FIG. 16, a loading roller 113 is provided in a disk player 112. This loading roller 113 is composed of 12 bar-like rollers arranged in parallel to each other so as to nip the disk between them, and arranged in parallel to the inserted disk and in the direction perpendicular to the disk insertion direction. One roller of the loading roller 113 is provided rotatably by the drive mechanism provided with a drive source.

As shown in FIGS. 16 and 17, a sensor 111a and a sensor 111b are provided with the loading roller 113 between them and in the front and the rear of the loading roller 113. The sensor 111a is provided at a position at which it is not off-positioned from the front end of a 12 cm disk D1 after leading-in, but is off-positioned from the front end of a 8 cm disk D2 (refer to FIG. 20). The sensor 111b is provided at a position at which the rear end of the disk D is off-positioned when the ejected disk D comes to a position at which the ejected disk D can be manually pulled out, and the rear end of the disk D is nipped a little by the loading roller 113 (refer to FIG. 21).

As shown in FIG. 16 and FIG. 17, these sensors 111a and 111b are arranged in the conveying direction of the disk D and on a line X passing through a middle portion of the loading roller 113 or in the vicinity of the line X, viewed from the direction of the plane surface. As shown in FIG. 17 and FIG. 18, a reflection type photo-interrupter 17 and a reflection sheet 19 in the sensors 111a and 111b, are arranged such that the light receiving and light emitting path of the sensors 111a and 111b and the line X are in almost perpendicular direction to each other, viewed from the direction of the plane surface.

Further, as shown in FIG. 18, the light receiving and light emitting surface 17a and the reflection sheet 19 of the sensors 111a are provided in the same direction as the light receiving and light emitting surface 17a and the reflection sheet 19 of the sensors 111b such that the light receiving and light emitting paths of sensors 111a and 111b are in the same direction as each other, viewed from the front direction. In this connection, the drive mechanism to drive the loading roller 113 is structured to be controlled by a control circuit, not shown, and the sensors 111a and 111b are connected to this control circuit.

4-2. Operation 4-2-1. Detection by Sensors

Initially, referring to FIG. 15A and FIG. 15B, detecting operations by each of sensors 111a and 111b will be described. That is, as shown in FIG. 15A, on a standby condition, the reflection type photo-interrupter 17 always emits the light, and the reflection sheet 19 always receives the light from the reflection type photo-interrupter 17. In contrast to this, as shown in FIG. 15B, when the disk D exists on the light receiving and light emitting surface of the reflection type photo-interrupter 17, because the reflected light of the light incident on the disk D advances in the another direction from the reflection type photo-interrupter 17, the reflection type photo-interrupter 17 does not receive the light from the disk 13. Because the light can not be received as described above, the existence of the disk 13 is detected.

4-2-2. Leading-in and Ejection of the Disk

Figure 19:
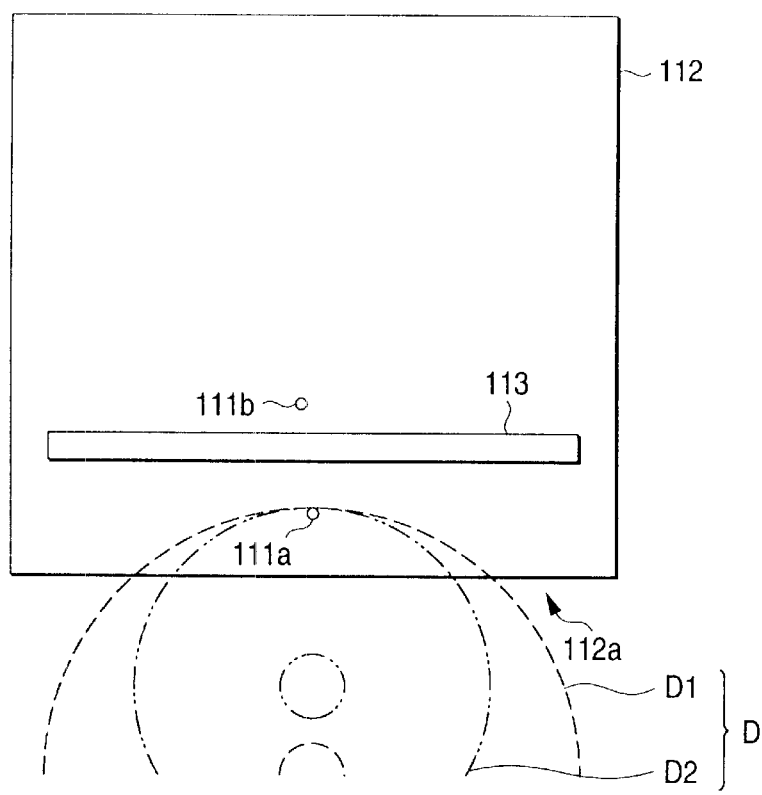
FIG. 19 is a simplified plan view showing the time of disk leading-in start in the embodiment of FIG. 15A.
Figure 20:
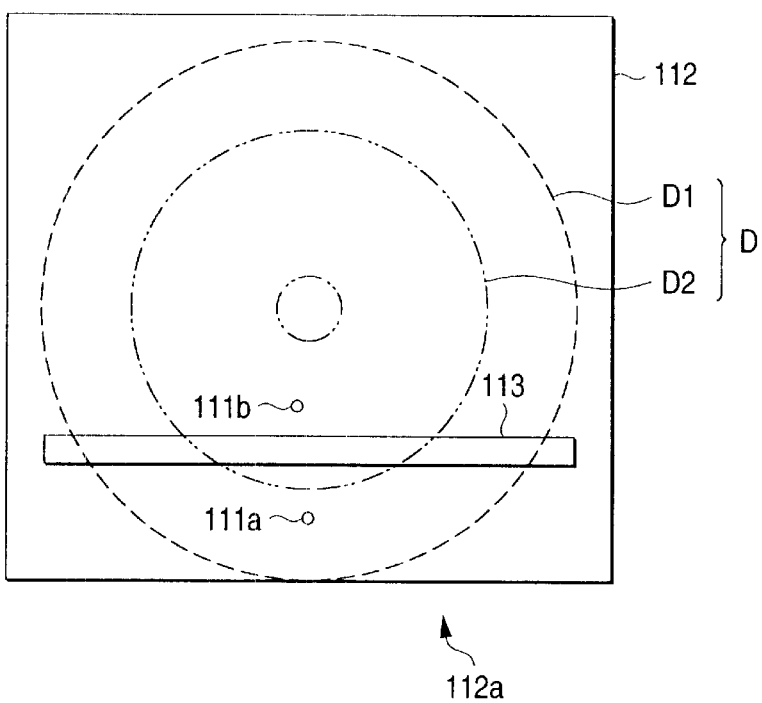
FIG. 20 is a simplified plan view showing the time of disk diameter detection in the embodiment of FIG. 15A.
Figure 21:
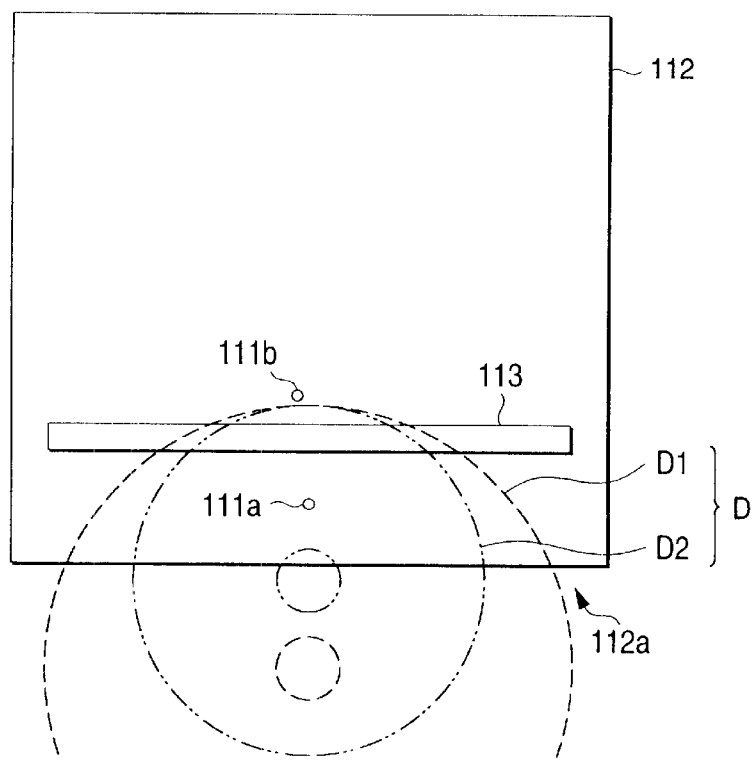
FIG. 21 is a simplified plan view showing the time of disk ejection in the embodiment of FIG. 15A.

Next, referring to FIGS. 19 to 21, the leading-in and ejecting operation of the disk based on the detection by the sensors 111a and 111b will be described. FIG. 19 shows the time of leading-in start, FIG. 20 shows the time of disk diameter judgment, and FIG. 21 shows the time of ejection stop, and the upper side in the drawing corresponds to the rear side, and the lower side in the drawing corresponds to the front side. Incidentally, the following operations are carried out by controlling the operation of the loading roller 113 by the control circuit, corresponding to the detection of the sensors 111a and 111b. That is, as shown in FIG. 19, when the disk D is inserted from the disk insertion inlet 111a, the sensor 111a detects the rear end of the disk D, and the loading roller 113 starts its rotation. Then, when the disk D is pushed in, the rear end of the disk D is nipped by the loading roller 113, and led in by the loading roller 113, and conveyed to the disk playing section.

After each of disks D which is respectively positioned by stoppers, not shown, for the 8 cm and 12 cm disks, is chucked in the disk playing section, this chucking is detected by a detector, not shown. At this time, as shown in FIG. 20, the diameter of the disk D is detected by the sensor 111a. That is, when the disk D exists on the sensor 11a, the disk D is judged to be the 12 cm disk D1, and when the front end of the disk D is off-positioned from the sensor 111a, the disk D is judged to be the 8 cm disk D2.

Figure 8:
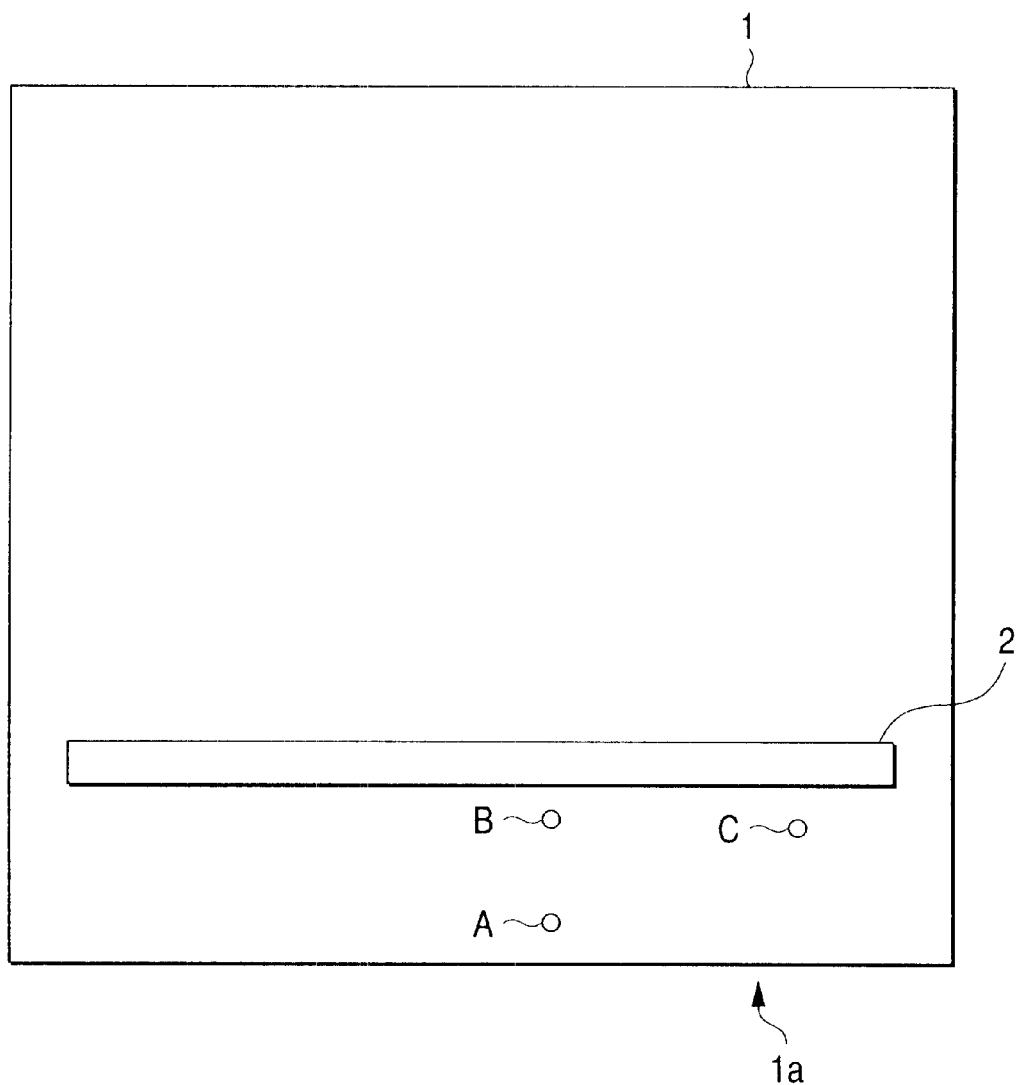
FIG. 8 is a simplified plan view showing the sensor arrangement in an example of the conventional disk player.
Figure 9:
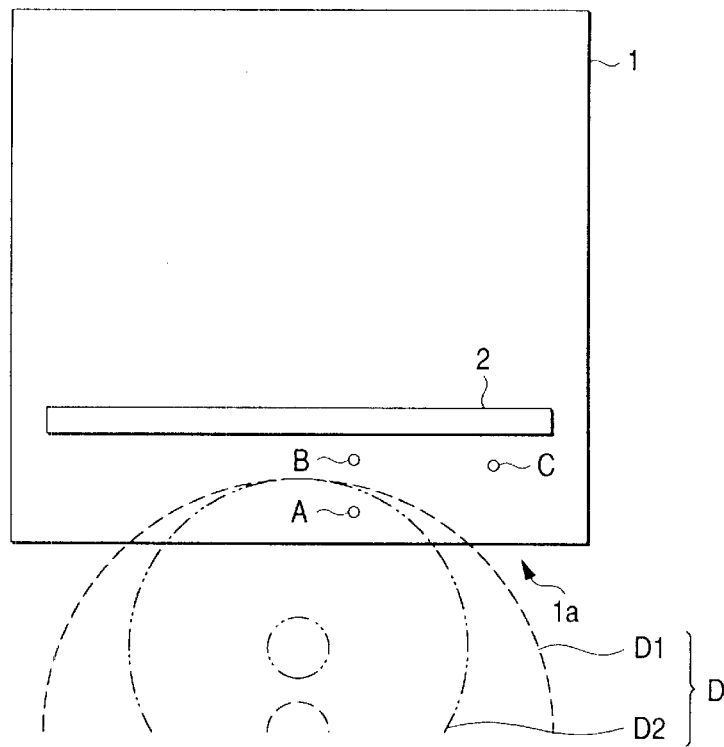
FIG. 9 is a simplified plan view showing the time of the disk leading-in start in the conventional example in FIG. 6.
Figure 10:
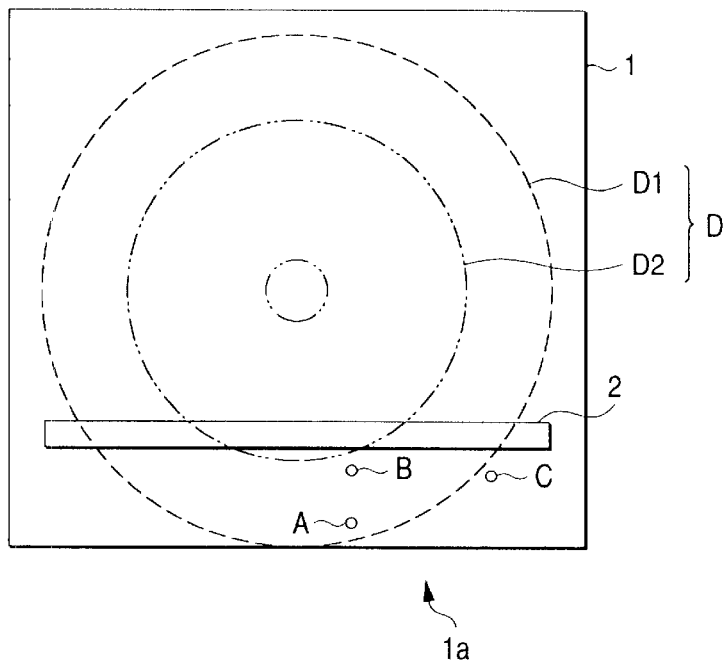
FIG. 10 is a simplified plan view showing the time of the disk diameter detection in the conventional example in FIG. 6.
Figure 11:
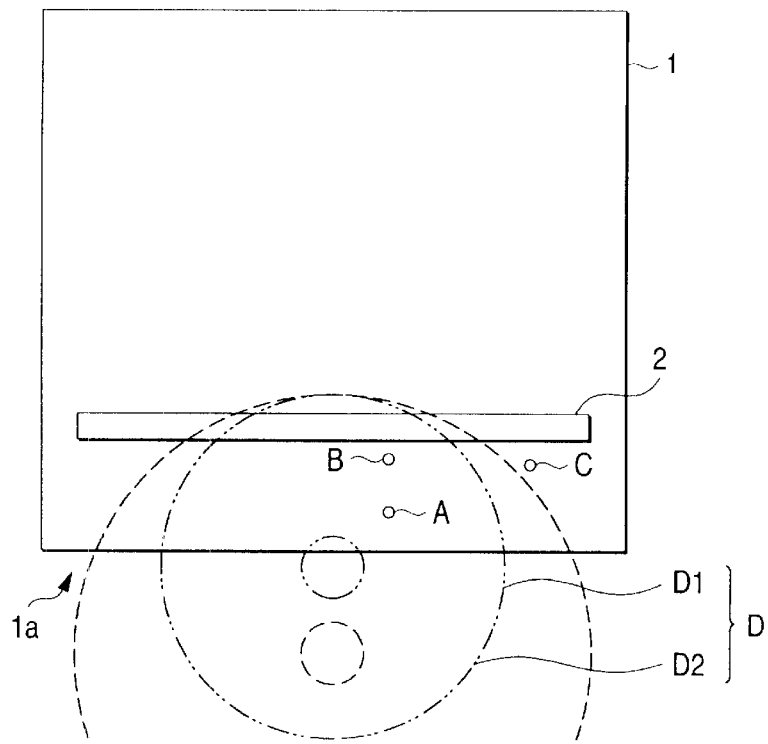
FIG. 11 is a simplified plan view showing the time of the disk ejection in the conventional example in FIG. 6.
Figure 12:
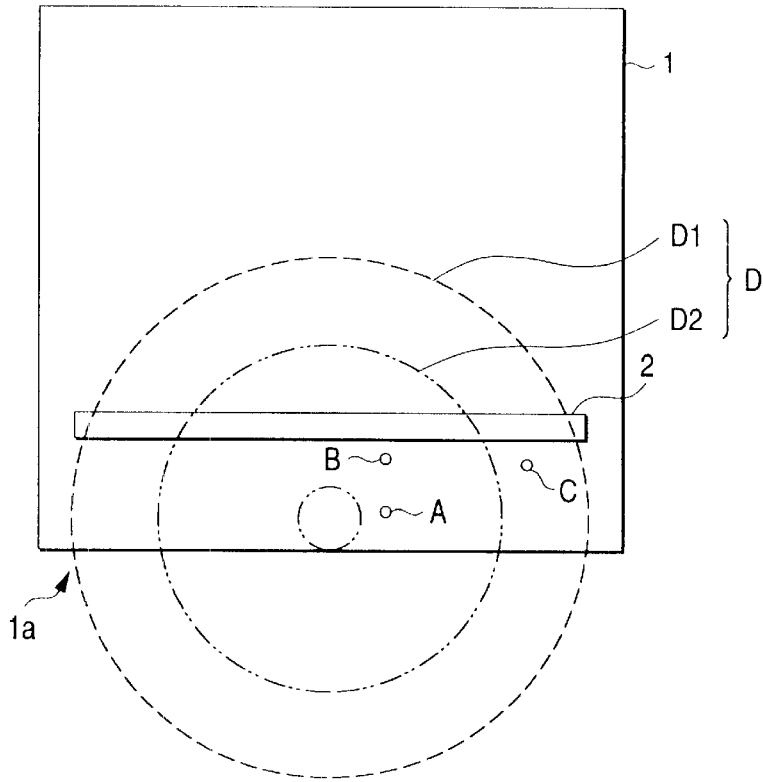
FIG. 12 is a simplified plan view showing the time of the disk re-leading-in start in the conventional example in FIG. 6.
Figure 13A:
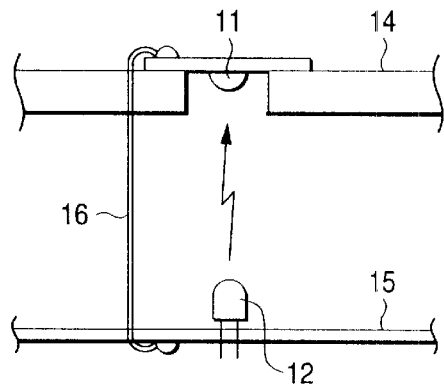
FIGS. 13A and 13B are structural views showing the conventional transmission type sensor.
Figure 13B:
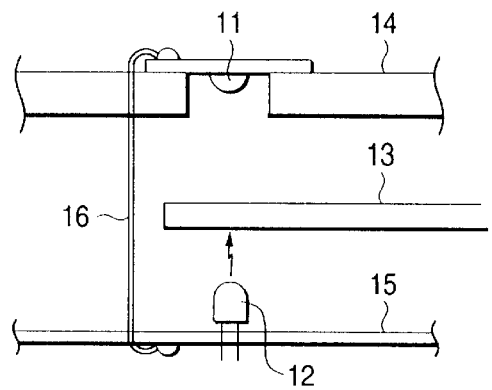
Figure 14A:
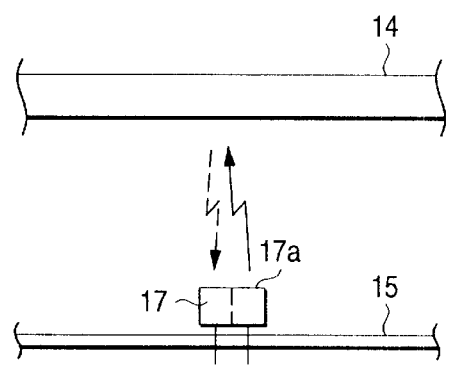
FIGS. 14A and 14B are structural views showing the conventional reflection type sensor.
Figure 14B:
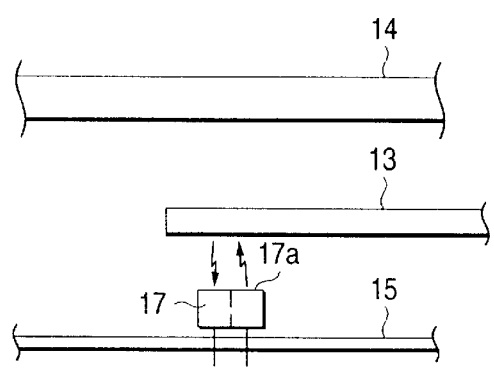

Next, when ejection of the disk D is directed by operating the operation button for ejection, the loading roller 113 nips the disk D, and is operated in reverse to the case of disk leading-in, and thereby, the disk D is sent out to the disk insertion inlet 11a side. As shown in FIG. 8, when the sensor b detects that the rear end of the disk D is off-positioned, the loading roller 113 is stopped in the state that the loading roller 113 nips the disk D a little, and the disk D is pulled out in this state.

4-3. Effect

Figure 30:
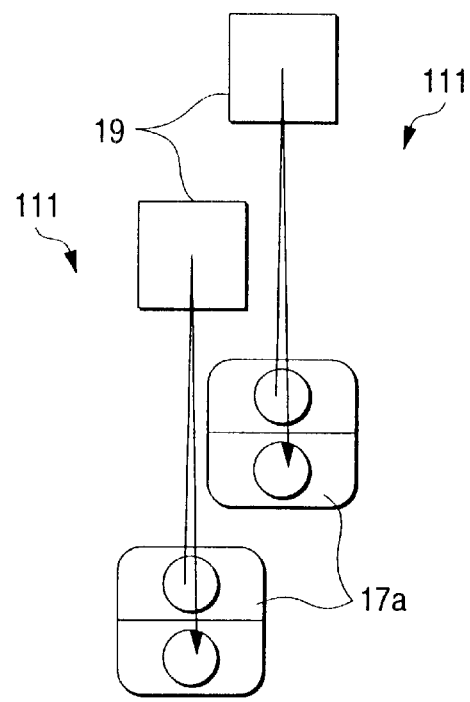
FIG. 30 is a plan view showing an example of the sensor arrangement in which the optical paths interfere with each other.

As described above, in the present embodiment, the arrangement directions of a plurality of sensors 111a and 111b are in perpendicular directions to respective light receiving and light emitting paths. Accordingly, for example, as shown in FIG. 30, when the sensor 111 is arranged in almost the same direction as its light receiving and light emitting path, there is a case in which the light of one light emitting section enters into the other light receiving section, however, the case in the present embodiment is different from this case, and no optical path interferes with the other one, and stable detection can be performed, thereby, malfunction based on the misdetection can be prevented.

Further, in the present embodiment, the reflection light from the disk D is not received, which is not the case in the conventional reflection type detection method, but, in reverse to that, such a detection method is applied that the existence of the disk D is detected by interrupting the light receiving of the reflection light by the disk D. Accordingly, without being influenced by dispersion of the reflectance of the disk D, the detection of the disk can always be performed accurately, by only the reflection light from the reflection sheet 19 for the exclusive use, provided in the mechanism, therefore, by a combination of the above-described effect by the arrangement of sensors 111a and 111b, the reliability of the product is further increased.

Further, in the present embodiment, because the reflection surface is structured by a silver reflection sheet 19, the reflection surface having high reflectance can be easily formed only by adhering the reflection sheet 19. The detection sensitivity of the reflection type photo-interrupter 17 can be easily set according to the reflectance of such the reflection sheet 19. Further, in the present embodiment, because a plastic spacer 18 is used, the reflection type photo-interrupter 17 can be easily arranged with inclination by the spacer 18, and leads 17b of the reflection type photo-interrupter 17 can be easily connected to the printed wiring board. Accordingly, the structure is simple, and the present embodiment is excellent in the assembly working property, therefore, even when a plurality of sensors 111a and 111b are provided, the structure is not complicated and the assembly working property is not lowered.

In the embodiment as shown in FIG. 18, the light emitting section is located lower than the light receiving section. Therefore, if the disk is positioned between the light emitting and receiving surfaces 17a and the refraction sheet 19, the reflected light from the disk is irradiated to the opposite side of the light receiving section with respect to the light emitting section. Thus, it is securely detected whether the disk is present or not.

For example, as shown in FIGS. 15A and 15B, in comparison with the case that the light emitting section is located upper than the light receiving section, the reflected light from the disk is irradiated to the side away from the receiving section. Thus, it is securely detected whether the disk is present or not.

[5. The Third Embodiment]

Figure 22:
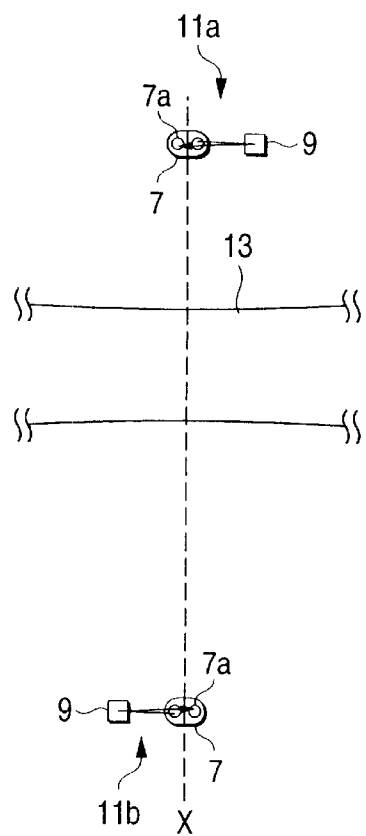
FIG. 22 is an enlarged plan view showing the arrangement of the sensors in the third embodiment of the disk player of the present invention.
Figure 23:
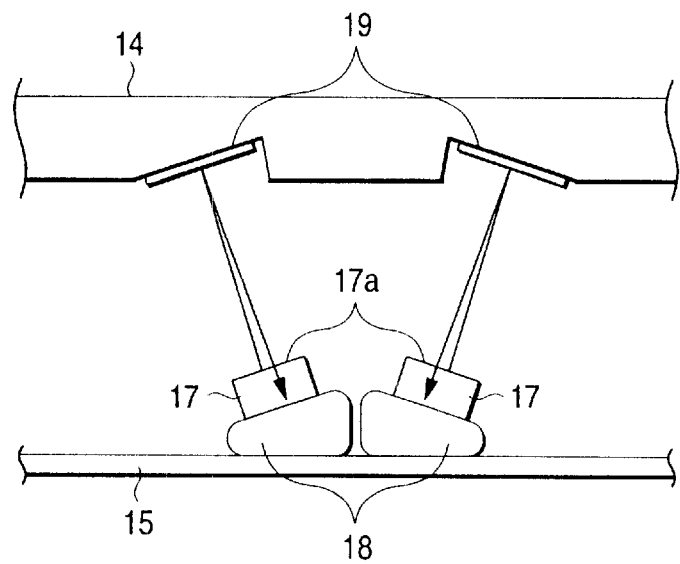
FIG. 23 is a front view of the sensor arrangement in FIG. 22.

Referring to FIGS. 22 and 23, the second embodiment of the present invention will be described bellow. That is, as shown in FIGS. 22 and 23, the reflection type photo-interrupters 17 in sensors 111a and 111b are arranged in the conveying direction of the disk D and on the line X passing through a middle portion of the loading roller 113, viewed from the direction of the plane surface. The light receiving and light emitting surface 17a and the reflection sheet 19 are arranged in such a manner that the light receiving and light emitting paths of sensors 111a and 111b are in a direction in which the paths are almost perpendicular to the line X, and the light receiving and light emitting path of the sensor 111a and the light receiving and light emitting path of the sensor 111b are in opposite direction to each other, viewed from the direction of the plane surface. As shown in FIG. 23, the light emitting paths in the sensors 111a and 111b, viewed from the direction of the front, form a V-character shape and are being separated from each other. Incidentally, the other structures are the same as in the above-described first embodiment.

According to the present embodiment described above, because the light receiving and light emitting paths of the sensors 111a and 111b are in contrary directions to each other, and the light receiving and light emitting surfaces 17a are not opposite to each other, the interference of the optical path is more surely prevented, and more stable detection can be attained.

[6. Another Embodiment]

Incidentally, the present invention is not limited to the embodiments described above, but various modifications can be made within the scope of the present invention. That is, in the present invention, the concrete structures for the arrangement direction of the sensors or the directions of optical paths, and for inclination arrangement of the optical elements, or the concrete structure of the reflection surface opposite to the optical element, can be freely selected.

Figure 24:
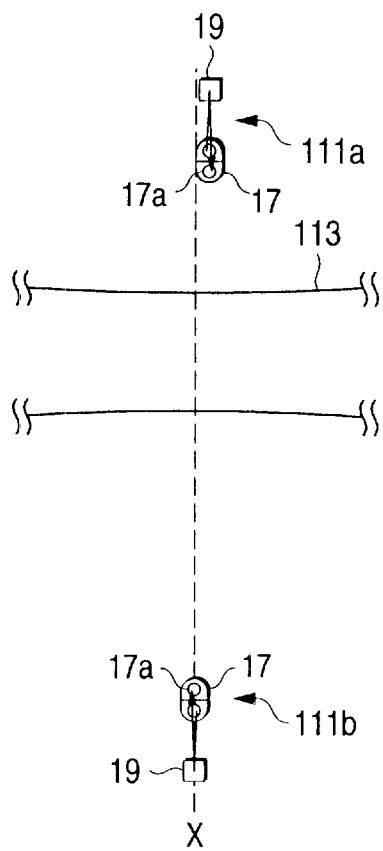
FIG. 24 is an enlarged plan view showing the arrangement of the sensors in another embodiment of the disk player of the present invention.
Figure 25:
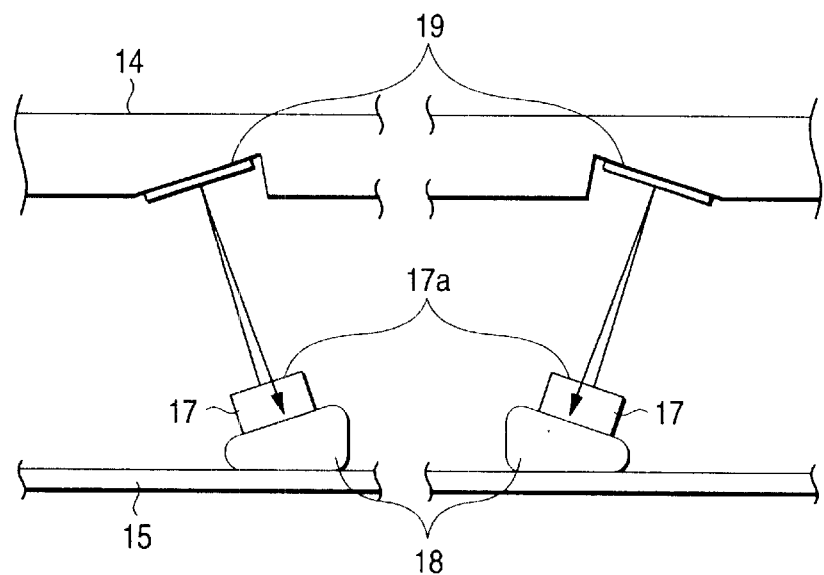
FIG. 25 is a front view of the sensor arrangement in FIG. 24.

For example, as shown in FIG. 24, an embodiment in which the sensors 111a and 111b are arranged so as to be almost in the same direction as the direction of their light receiving and light emitting paths, viewed from the direction of the plane surface, and the light receiving and light emitting surface 17a and the reflection sheet 19 are arranged so that the light emitting path in the sensor 111a and that in the sensor 111b are contrary to each other, may also be structured. Incidentally, in the present embodiment, as shown in FIG. 25, the light emitting paths of sensors 111a and 111b, viewed from the right side surface direction, are in a V-character shape and in the direction separating from each other. According to such the embodiment, optical paths of both sensors 111a and 111b are in the contrary direction to each other, and because the light receiving light emitting surfaces 17a are not opposite to each other, the interference is prevented, and the same effects as in the embodiment described above can be obtained, and an arrangement space in the lateral direction of sensors 111a and 111b can be effectively utilized.

Figure 26:
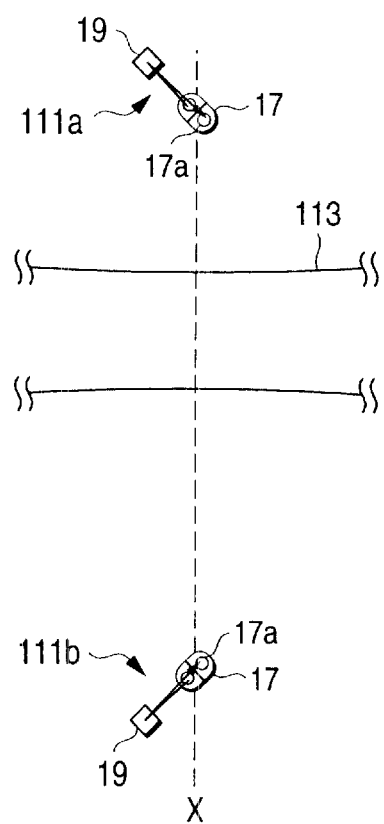
FIG. 26 is an enlarged plan view showing the arrangement of the sensors in another embodiment of the disk player of the present invention.
Figure 27:
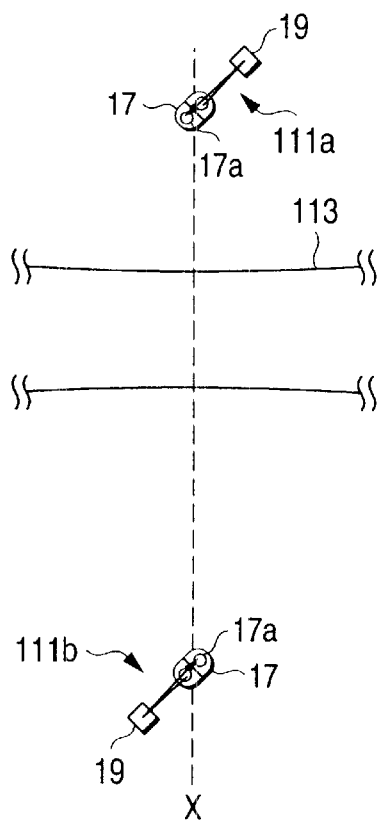
FIG. 27 is an enlarged plan view showing the arrangement of the sensors in still another embodiment of the disk player of the present invention.

Further, an embodiment in which sensors 111a and 111b are arranged such that the direction of their light receiving light emitting paths is in the slanting direction to the line X which is the conveying direction of the disk D, may also be structured. For example, as shown in FIG. 26, viewed from the direction of the plane surface, even if the sensors 111a and 111b are arranged such that the direction of their light receiving and light emitting paths form an A-character shape and the light emitting paths are in directions separating from each other, or even if, as shown in FIG. 27, the sensors 111a and 111b are arranged such that their light receiving and light emitting paths are in the contrary directions to each other and the light emitting paths are in directions separating from each other, the same effects as in the embodiment described above can be obtained.

Further, relating also to the number of sensors, it is not limited to two as in the above-described embodiment, but may be more than three. In such a case, by combining the example of arrangement of the sensor 111 in the direction as in the above-described embodiment, the interference of the optical paths of a large number of sensors 111 can be prevented.

Further, the inclination means of the reflection type photo-interrupter 17 is not limited to the spacer 18 with inclination, but another means such as a mounting bracket, or the like, may also be used. Further, the reflection type photo-interrupter 17 is not necessary to be mounted on the printed wiring board, but may be mounted onto other members.

Figure 28:
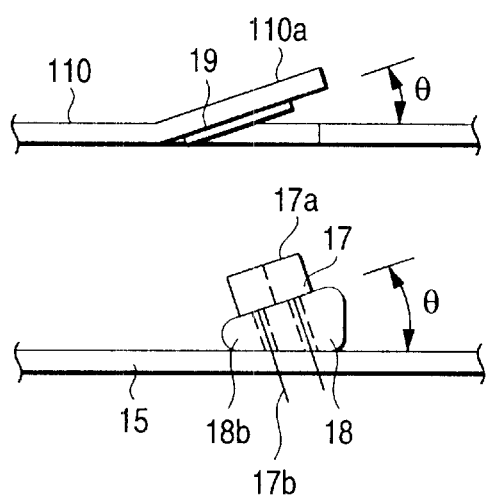
FIG. 28 is a structural view showing another example of the sensor in the disk player of the present invention.

Further, relating to the reflection surface, as shown in FIG. 28, it is considered that the reflection surface is structured in such a manner that a bent portion 10a with a predetermined inclination θ is formed on a portion of a sheet metal 110 of the upper portion of the mechanism, and the same reflection sheet 19 is adhered onto the surface of the bent portion 110a. In this connection, it may also be possible that the reflection surface is formed by utilizing the existing inclined portion of the sheet metal 110, and the reflection type photo-interrupter 17 is arranged in opposite to the reflection surface. The present invention can easily utilize the existing structure as described above, and is excellent in practicability.

Further, material of the reflection sheet 19 is not limited to silver, but may be appropriately selected, and further, a light reflective material layer may be formed by coating the light reflective material, instead of adhering the reflection sheet. Further, when a member itself constituting the reflection surface has a sufficient reflectance, its surface may be used as it is, as the reflection surface.

Figure 29:
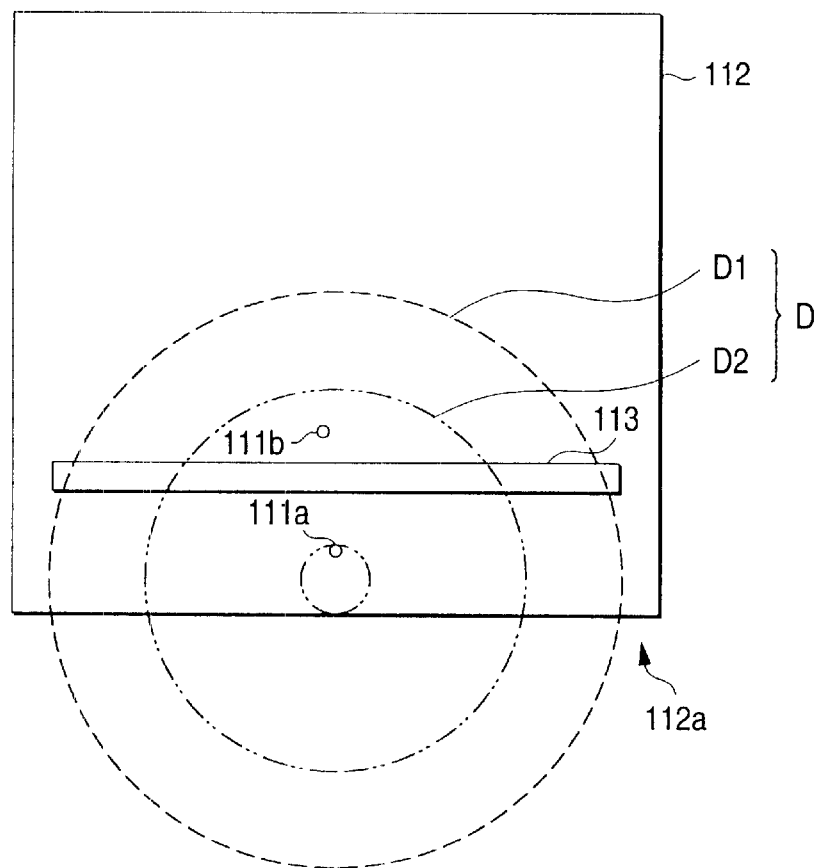
FIG. 29 is a simplified plan view showing the time of disk re-leading-in start in another embodiment of the disk player of the present invention.

Further, the sensor 11a in the above-described embodiment can also be provided with a function by which the peripheral portion of the central hole of the disk, or the boundary portion of the transparent portion and the reflection portion of the inner periphery of the disk, can be detected. In such the structure, when the disk D is pushed in again from the ejection stop state as shown in FIG. 21, the peripheral portion of the central hole of the disk, or the boundary portion of the transparent portion and the reflection portion of the inner periphery of the disk, is detected by the sensor 1a, as shown in FIG. 29, the loading roller 113 is rotated in the same direction as in the time of the disk leading-in, and the disk D is led in again.

In the above description, only the case where disk D is detected, is described, however the present invention is not limited to that, but, can also be applied to the case where positions of various objects, such as various operation members in the disk player 12, or the like, are detected, in the same manner as the desk detection, and the same excellent effects can be obtained.

Further, the widely known technology can freely be applied to various mechanisms in the disk player 112. For example, the disk conveying section to lead-in and eject the disk D may be structured by another structure roller, or another mechanism other than the roller.

As described above, according to the present invention, even when a plurality of reflection type optical elements are used, a disk player in which stable detection can be performed by a simple structure, and malfunction can be prevented, can be provided.

What is claimed is:

1. A disk player comprising:
    a disk conveying section having a loading roller driven by a driver; and
    a detecting section to detect control information of leading-in and ejection of one of a larger disk and a smaller disk by the disk conveying section,
    wherein said detecting section includes a first sensor which is positioned on or in a vicinity of a center line (X) of a disk conveying path so that an edge portion of the center hole of the disk or a boundary portion of a transparent portion and a reflection portion of an inner periphery of the disk is detected when the disk is conveyed by the disk conveying section, and is positioned between the loading roller and a disk insertion inlet so as to detect the larger disk only when the disk is loaded and positioned at a reproducing position, and
    wherein said first sensor detects a start timing of leading-in the disk when the disk is inserted, a disk size after the leading-in is completed, and a start timing of the re-leading-in the disk when the disk is pushed after ejection.

2. A disk player according to claim 1, wherein said detecting section includes a second sensor which is positioned in vicinity of the loading roller and detects an outer end of the disk under the condition that loading roller nip the end of the disk when ejection so that a stop state of ejection is detected.

3. A disk player according to claim 1, wherein said first sensor is one of a reflection type sensor and a transmission type sensor.

4. A disk player according to claim 2, wherein said first and, second sensors are one of reflection type sensors and transmission type sensors.

5. A disk player comprising:
    a disk conveying section driven by a driver; and
    a detecting section to detect control information of leading-in and ejection of the disk by the disk conveying section,
    wherein said detecting section includes a first sensor which detects a state of a leading-in start of the disk, a state of a re-leading-in start of the disk and a diameter of the disk,
    wherein said first sensor includes an optical element having said light receiving and light emitting surface, and said reflection surface provided at a position where the light from the light emitting surface is reflected onto the light receiving surface,
    wherein the light receiving and light emitting surface and the reflection surface are arranged with an inclination to the horizontal surface of the mechanism; and
    wherein said detecting section is provided at a position at which optical paths between the optical element and the reflection surface do not interfere with each other.

6. A disk player according to claim 5, wherein at least two detecting sections are arranged such that an optical path of one is in a different direction from the others, viewed from the direction of the plane surface of the mechanism.

7. A disk player according to claim 5, wherein at least two detecting sections are arranged such that an optical path of one is almost perpendicular to the others, viewed from the direction of the plane surface of the mechanism.

8. A disk player according to claim 5, wherein at least two detecting sections are arranged such that the optical paths are reverse to each other, viewed from the direction of the plane surface of the mechanism.

9. A disk player according to claim 5, wherein at least two detecting sections are arranged such that one light receiving and light emitting surface is not opposed to the other light receiving and light emitting surface.

10. A disk player comprising:
    a plurality of detecting sections each for detecting an object in a mechanism, each of said detecting section including an optical element having a light receiving and light emitting surface, and a reflection surface provided at a position where the light from the light emitting surface is reflected onto the light receiving surface,
    wherein the light receiving and light emitting surface and the reflection surface are arranged with an inclination to the horizontal surface of the mechanism; and
    said detecting sections are provided at positions at which optical paths between the optical element and the reflection surface do not interfere with each other.

11. A disk player according to claim 10, wherein at least two detecting sections are arranged such that an optical path of one is in a different direction from the others, viewed from the direction of the plane surface of the mechanism.

12. A disk player according to claim 10, wherein at least two detecting sections are arranged such that an optical path of one is almost perpendicular to the others, viewed from the direction of the plane surface of the mechanism.

13. A disk player according to claim 10, wherein at least two detecting sections are arranged such that the optical paths are reverse to each other, viewed from the direction of the plane surface of the mechanism.

14. A disk player according to claim 10, wherein at least two detecting sections are arranged such that one light receiving and light emitting surface is not opposed to the other light receiving and light emitting surface.

15. A disk player comprising:
- a driver;
- a disk conveying section driven by said driver; and
- a detecting section to detect a leading-in and an ejection of a disk by the disk conveying section,
- wherein said detecting section includes at least one sensor which detects a disk condition,
- wherein said at least one sensor includes light receiving and light emitting surfaces, and a reflection surface provided at a position where the light from the light emitting surface is reflected onto the light receiving surface, and
- wherein said detecting section is provided at a position at which optical paths between the optical element and the reflection surface do not interfere with each other.

16. A disk player according to claim 15, wherein the light receiving and light emitting surface and the reflection surface are inclined relative to a surface of said disk.

17. A disk player according to claim 15, wherein said at least one sensor detects a state of a leading-in start of the disk, a state of a re-leading-in start of the disk and a diameter of the disk.

18. A disk player according to claim 15, wherein said at least one sensor comprises a plurality of reflection type optical elements or transmission type optical elements.

19. A disk player according to claim 15, wherein after ejection of said disk, and said disk is pushed again, said at least one sensor detects a re-leading-in of said disk.

20. A disk player according to claim 19, wherein after said at least one sensor detects a re-leading-in of said disk, said first sensor detects a start timing of leading-in the disk and a disk size.

* * * * *